中
United States Patent [19]

Estkowski

[11] Patent Number: 5,415,252

[45] Date of Patent: May 16, 1995

[54] TWIN WHEEL CASTER AND BRAKE ASSEMBLY

[75] Inventor: Michael H. Estkowski, St. Joseph, Mich.

[73] Assignee: Shepherd Products U.S., Inc., St. Joseph, Mich.

[21] Appl. No.: 245,676

[22] Filed: May 18, 1994

[51] Int. Cl.$^6$ .................................................. B60B 33/00
[52] U.S. Cl. ..................................... 188/1.12; 16/35 R
[58] Field of Search ................. 16/35 R; 188/1.12, 31, 188/60, 69, 74, 82.7, 265

[56] References Cited

U.S. PATENT DOCUMENTS

| | | |
|---|---|---|
| 2,138,433 | 11/1938 | Sunden . |
| 2,494,696 | 1/1950 | Forbes . |
| 2,707,794 | 5/1955 | Kramcsak, Jr. . |
| 2,972,163 | 2/1961 | Ross et al. . |
| 3,066,764 | 12/1962 | Clinton et al. . |
| 3,162,888 | 12/1964 | Möbus . |
| 3,228,089 | 1/1966 | Turner . |
| 3,238,558 | 3/1966 | Greene . |
| 3,298,467 | 1/1967 | Darnell . |
| 3,571,842 | 3/1971 | Fricke . |
| 4,110,866 | 9/1978 | Ishii ........................ 16/35 R |
| 4,333,207 | 6/1982 | Atwood . |
| 4,479,566 | 10/1984 | Ishii ........................ 188/1.12 |
| 4,550,808 | 11/1985 | Folson ...................... 188/1.12 |
| 4,559,668 | 12/1985 | Black . |
| 4,664,231 | 5/1987 | James ....................... 188/1.12 |
| 4,669,580 | 6/1987 | Neville ..................... 188/1.12 |
| 4,681,192 | 7/1987 | James ....................... 188/1.12 |
| 4,720,893 | 1/1988 | Mellwig et al. . |
| 4,805,259 | 2/1989 | Kassai ...................... 188/1.12 |
| 4,843,677 | 7/1989 | Shane . |
| 4,911,269 | 3/1990 | Perl ......................... 188/1.12 |
| 4,985,960 | 1/1991 | Zun .......................... 188/1.12 |

FOREIGN PATENT DOCUMENTS

3429834A1  2/1986  Germany .
2151470  7/1985  United Kingdom ................ 16/35 R Primary Examiner—Robert J. Oberleitner
Assistant Examiner—Alfred Muratori
Attorney, Agent, or Firm—Lee, Mann, Smith, McWilliams, Sweeney & Ohlson

[57] ABSTRACT

A twin wheel caster and brake assembly including a central body with an axle mounted thereto which extends outwardly from opposite sides of the central body. A pair of wheels are rotatably mounted on each end of the axle and include a plurality of radially inwardly extending ribs with adjacent ribs defining a recess therebetween. At least one slot is formed in the central body. A locking bar associated with a brake actuating lever is located within the slot and is moveable therein between a brake locked position wherein the locking bar is located within the recesses for engagement with the ribs of the wheels and an unlocked position wherein the locking bar is located out of contact with the ribs. A pivot member is associated with the brake actuating lever and the central body to facilitate movement of the brake actuating lever and locking bar between the locked and unlocked positions. A detent finger is formed in the central body and is associated with the slot to act on the locking bar when the locking bar is in the unlocked position urging the locking bar to stay in the unlocked position.

7 Claims, 2 Drawing Sheets

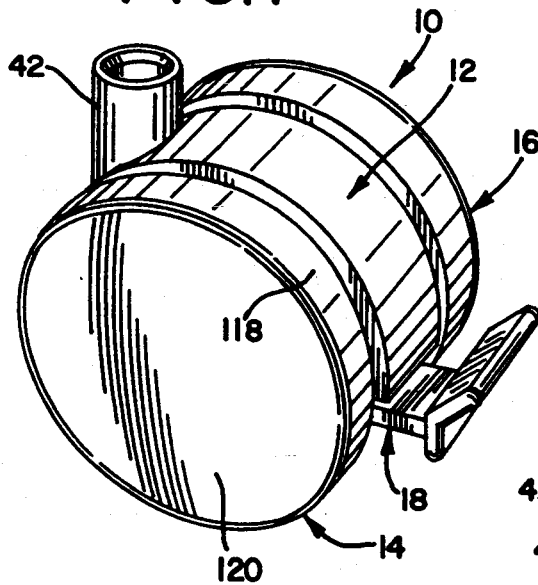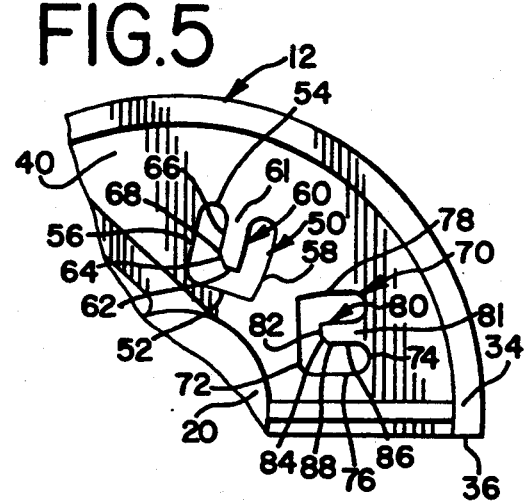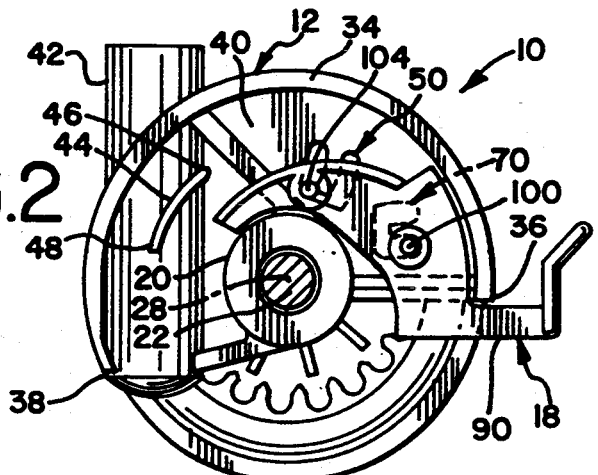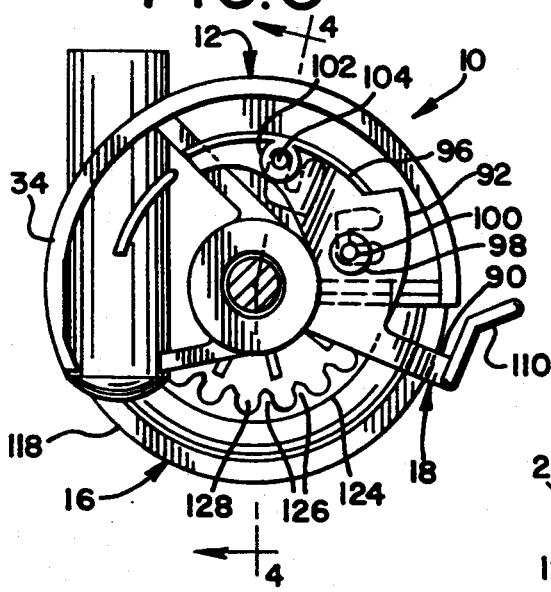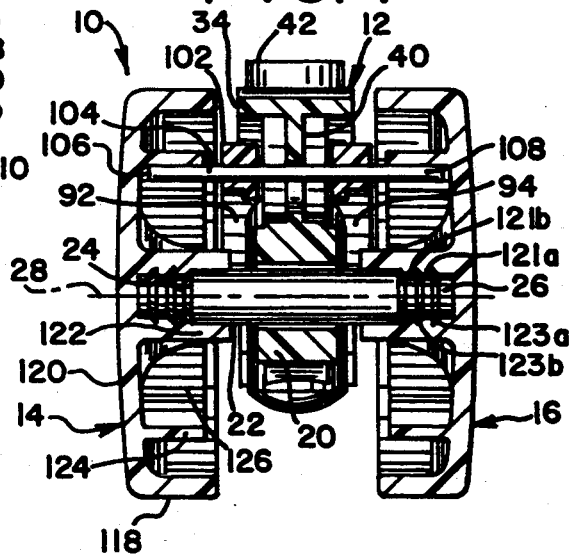

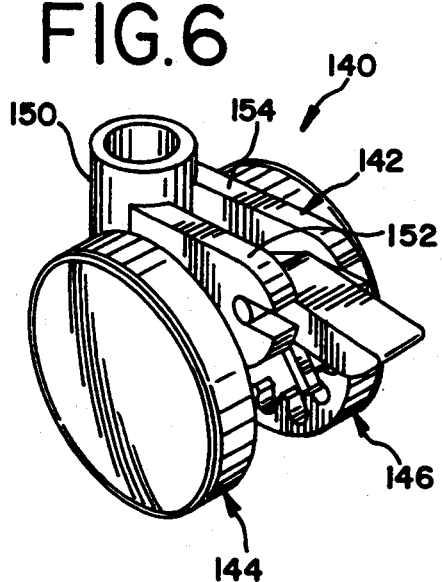
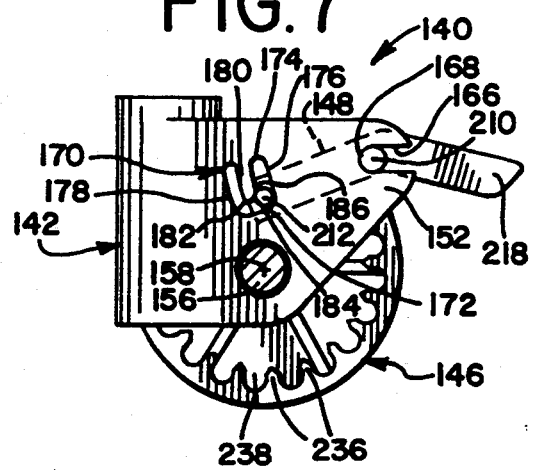
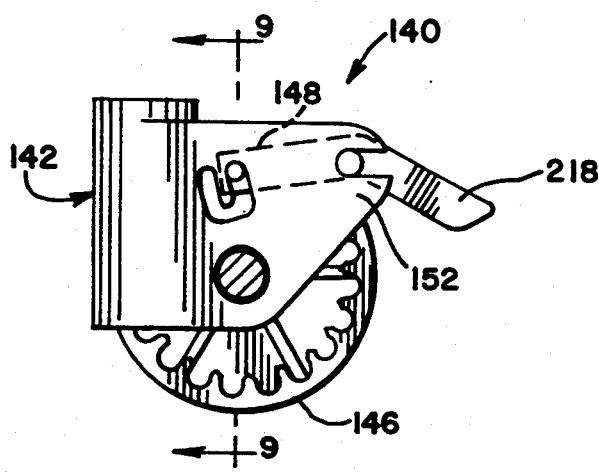
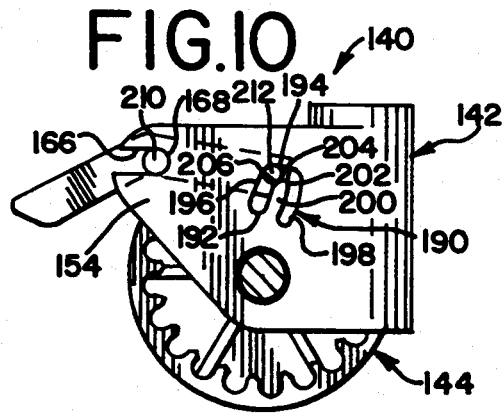
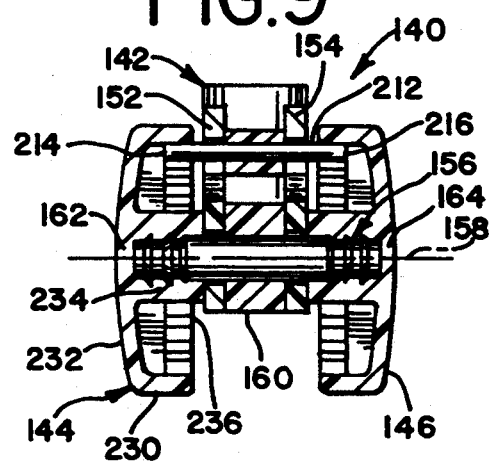

TWIN WHEEL CASTER AND BRAKE ASSEMBLY

BACKGROUND OF THE INVENTION

The present invention is directed to a caster used to support articles such as furniture or the like for rolling movement along a support surface and in particular to a caster having a brake assembly for selectively preventing rolling movement of the caster.

Braking arrangements have previously been used in connection with casters as shown in U.S. Pat. Nos. 4,333,207 and 4,911,269. Neither of these patents disclose a caster having a brake assembly utilizing a locking bar moveable between locked and unlocked positions within a slot formed in a central body of the caster and utilizing first and second detent fingers adapted to urge the locking bar to stay in either the locked position or the unlocked position.

SUMMARY OF THE INVENTION

The present invention provides a twin wheel caster and brake assembly. The assembly includes a central body defining a hub. An axle is mounted through the hub and extends outwardly from opposite sides of the central body. The assembly also includes a pair of wheels, one wheel mounted on each end of the axle. Each wheel defines a plurality of radially inwardly extending ribs on an inner face thereof with adjacent ribs defining a recess therebetween. A brake actuating lever is pivotally attached to the central body and is moveable between a brake locked position and a brake unlocked position. At least one slot is formed in the central body having a first end and a second end. A locking bar associated with the brake actuating lever extends from both sides thereof and is moveable within the slot when the brake actuating lever moves between locked and unlocked positions. In the locked position the ends of the locking bar are positioned within the recesses between the ribs of the wheels for preventing rotation of the wheels by engagement with the ribs. In the unlocked position the ends of the locking bar are located outside of the recesses and out of contact with the ribs, allowing the wheels to freely rotate. A first detent finger is formed in the central body and is associated with the slot. The first detent finger is adapted to act on the locking bar when it is in the unlocked position to urge the locking bar to stay in the unlocked position. A second detent finger is associated with a second slot in the central body and is adapted to urge the locking bar to stay in the locked position.

DESCRIPTION OF THE DRAWINGS

FIG. 1 is a perspective view of a first embodiment of the twin wheel caster and brake assembly of the present invention.

FIG. 2 is a side elevational view of the first embodiment shown with one wheel removed and with the brake actuating lever in the brake unlocked position.

FIG. 3 is a side elevational view of the first embodiment shown with one wheel removed and with the brake actuating lever in the brake locked position.

FIG. 4 is a cross-sectional view taken along lines 4—4 of FIG. 3.

FIG. 5 is an enlarged partial side elevational view of the central body of the first embodiment.

FIG. 6 is a perspective view of a second embodiment of the twin wheel caster and brake assembly of the present invention.

FIG. 7 is a side elevational view of the second embodiment shown with one wheel removed and with the brake actuating lever in the brake unlocked position.

FIG. 8 is a side elevational view of the second embodiment shown with one wheel removed and with the brake actuating lever in the brake locked position.

FIG. 9 is a cross-sectional view of the second embodiment taken along lines 9—9 of FIG. 8.

FIG. 10 is an opposite side elevational view of the second embodiment shown with one wheel removed and with the brake actuating lever in the brake locked position.

DETAILED DESCRIPTION OF THE PREFERRED EMBODIMENTS

FIGS. 1–5 show a first embodiment of the twin wheel caster and brake assembly of the present invention. FIG. 1 shows a caster 10 having a central body 12, a first wheel 14 and a second wheel 16 rotatably mounted with respect to the central body 12, and a brake actuating lever 18 pivotally mounted to the central body 12.

As best shown in FIG. 2, the central body 12 includes a hub 20 having a cylindrical bore extending therethrough. An axle 22 having a first end 24 and a second end 26 extends through the hub 20 such that the ends 24 and 26 of the axle 22 extend outwardly from opposite sides of the central body 12. The axle 22 includes a longitudinal axis 28 which extends generally horizontally. The central body 12 also includes a curved outer rim 34 which extends in a generally circular fashion about the axis 28 from a first edge 36 to a second edge 38. A wall 40 is connected to and extends between the hub 20 and rim 34. The central body 12 also includes a socket 42 adapted to receive a pintle (not shown) which is attached to an article such as a piece of furniture or the like. A curved flange 44 extends outwardly from each side of the wall 40 and socket 42 (only one side shown). The flanges 44 extend along a circular arc about the axis 28 between a first edge 46 and a second edge 48. The flanges 44 act as a cosmetic sight shield to prevent viewing of the internal components of the caster 10.

As best shown in FIG. 5, a first slot arrangement 50 is formed in the wall 40 of the central body 12. The slot 50 extends between an inner end wall 52 and an outer end wall 54 and between a first side wall 56 and a second side wall 58. A resilient detent finger 60 is attached at its base 61 to the outer end wall 54 and extends inwardly into the slot 50 terminating at a tip 62. The detent results in the slot aperture being of a generally U-shape. The tip 62 is spaced apart from the inner end wall 52 such that the finger 60 may resiliently deflect along its longitudinal axis. The tip 62 includes a recessed portion 64 adapted to engage the locking bar 104. The detent finger 60 also includes a wall 66 which extends from the second end wall 54 to an edge 68 formed between the wall 66 and the recessed portion 64. The tip 62 of the detent finger 60 is located slightly closer to the first side wall 56 of the slot 50 than is the base 61 such that the distance between the edge 68 of the tip 62 and the first side wall 56 is shorter than the distance between the wall 66 at the base 61 and the first side wall 56. The slot 50 is located in the wall 40 above the hub 22 and to the right of the axis 28 as shown in FIG. 2. The portion of the slot 50 located between the end walls 52 and 54 and between the first side wall 56 and the detent finger 60 is orientated to extend generally radially from the axis 28.

As also best shown in FIG. 5, a second slot arrangement 70 is formed in the wall 40 of the central body 12 of similar configuration to the slot arrangement 50 but rotated approximately 90°. The second slot 70 extends between an inner end wall 72 and an outer end wall 74 and between a first side wall 76 and a second side wall 78. A resilient detent finger 80 is attached at its base 81 to the outer end wall 74 and extends inwardly into the slot 70 terminating at a tip 82. The tip 82 is spaced apart from the first end wall 72 such that the finger 80 may resiliently deflect along its longitudinal axis. The tip 82 includes a recessed portion 84 adapted to engage the pin 100. The detent finger 80 also includes a wall 86 which extends from the second end wall 74 to an edge 88 formed between the wall 86 and the recessed portion 84. The second slot 70 is located below and to the right of the first slot 50 as shown on FIG. 2 with the end walls 72 and 74 extending generally vertically and the first and second side walls 76 and 78 extending generally horizontally. The tip 82 of the finger 80 is located slightly closer to the first side wall 76 of the slot 70 than is the base 81 such that the distance between the edge 88 of the tip 82 and the first side wall 76 is shorter than the distance between the wall 66 at the base 81 and the first side wall 76. The detent finger 80 is orientated at an angle of approximately 60° to the detent finger 60 but may be orientated at other angles as desired.

As shown in FIGS. 2 and 4 the brake actuating lever 18 includes a base 90 which extends horizontally beyond each side of the wall 40. A first curved arm 92 and a second curved arm 94 extend from the base 90 on respectively opposite sides of the wall 40 between the hub 20 and the rim 34 of the central body 12. As best shown in FIG. 3, each arm 92 and 94 includes a curved outwardly extending flange 96 which conforms to an arc of a circle such that when the brake actuating lever 18 is in the locked position as shown in FIG. 3 the flange 96 and the flange 44 form segments of a circle having an origin on the axis 28. The flanges 96 also act as a sight shield. Each arm 92 and 94 includes a hub 98. A cylindrical pin 100 extends through the hubs 98 in the arms 92 and 94 and through the second slot 70 in the wall 40 of the central body 12. The pin 100 is located between the first side wall 76 and the detent finger 80 and is moveable between the inner end wall 72 and the outer end wall 74 as will be more fully described herein. The pin 100 has a diameter which is slightly larger than the distance between the edge 88 of the tip 82 of the detent finger 60 and the first side wall 76 of the slot 70.

Each arm 92 and 94 also includes a hub 102. A locking bar 104 extends through each hub 102 and through the slot 50 in the wall 40 of the central body 12. The locking bar 104 is generally cylindrical and extends outwardly from both sides of the actuating lever 18 between a first end 106 and a second end 108. The locking bar 104 is positioned within the slot 50 between the first side wall 56 and the detent finger 60 and is moveable between the inner end wall 52 and the outer end wall 54. The locking bar 104 has a diameter which is slightly larger than the distance between the edge 68 of the tip 62 of the detent finger 60 and the first side wall 56 of the slot 50. An actuating member 110 is connected to the end of the base 90 of the brake actuating lever 18 and is disposed outwardly of the central body 12 to provide for selective pivotal movement of the brake actuating lever 18 and the associated locking bar 104 between an unlocked position as shown in FIG. 2 and a locked position as shown in FIGS. 3 and 4.

Each of the wheels 14 and 16 includes a circular outer rim 118 for rolling engagement with a floor or other support surface and a side wall 120 extending within an outer edge of the rim 118. A hollow cylindrical hub 122 is shown in FIG. 4 located concentrically within the outer rim 118 and extends inwardly from the side wall 120. The ends 24 and 26 of the axle 22 are located respectively in each hub 122 of the wheels 14 and 16. Circular projecting ribs 123A and 123B formed on the ends 24 and 26 of the axle 22 mate with inwardly extending grooves 121A and 121B formed on the interior surface of the hubs 122 to retain the wheels 14 and 16 on the axle 22 while permitting rotation of the wheels 14 and 16 about the axle 22 and axis 28. An inner circular rim 124 extends concentrically about the hub 122 and concentrically within the outer rim 118. A plurality of ribs 126 best shown in FIGS. 2 and 3 are equally spaced around the inner rim 124 and extend radially inwardly from an inner face of the inner rim 124. Each pair of adjacent ribs 126 defines a recess 128 therebetween.

As best shown in FIG. 4, the first end 106 of the locking bar 104 extends within the inner rim 124 of the first wheel 14 and the second end 108 of the locking bar 104 extends within the inner rim 124 of the second wheel 16. When the actuating lever 18 is in the unlocked position as shown in FIG. 2, the pin 100 is located adjacent the outer end wall 74 and between the first side wall 76 and the detent finger 80. The locking bar 104 is located within the slot 50 adjacent to the inner end wall 52 and adjacent to the recess 64 in the tip 62 of the detent finger 60 such that the detent finger 60 is in a relaxed or unbiased position. Alternatively, the recess 64 could be biased against the locking bar 104 when in the unlocked position. The recessed portion 64 in the tip 62 of the detent finger 60 engages the locking bar 104 when it is attempted to move the locking bar 104 towards the outer end wall 54. The detent finger 60 thereby urges the locking bar 104 to remain in this location adjacent to the inner end wall 52. When the brake actuating lever 18 is in the unlocked position as shown in FIG. 2, the locking bar 104 is positioned outside of the recesses 128 and out of contact with the ribs 126 such that the wheels 14 and 16 may freely rotate about the axle 22.

The brake actuating lever 18 and the associated locking bar 104 is moved from the unlocked position as shown in FIG. 2 to the locked position as shown in FIG. 3 by pressing downwardly on the actuating member 110. As the actuating member 110 is pressed downwardly, the pin 100 will move laterally from its position adjacent the outer end wall 74, as shown in FIG. 2, to a position adjacent the inner end wall 72 while the locking bar 104 simultaneously moves upwardly from its position adjacent the inner end wall 52, as shown in FIG. 2, to a position adjacent the outer end wall 54 as shown in FIG. 3. As the actuating member 110 is moving downwardly the brake actuating lever pivots in a clockwise direction about the pin 100 while the pin 100 is moving laterally. The actuating member 110 must be pressed downwardly with sufficient force to overcome the retention force applied to the locking bar 104 by the tip 62 of the finger 60 to enable deflection of the tip 62 of the finger 60 away from the first side wall 56 to allow the locking bar 104 to pass by the recess 64 and to move to the outer end wall 54 and to enable the simultaneous movement of the pin 100 to the inner end wall 72. As the pin 100 moves from the outer end wall 74 to the inner end wall 72 of the slot 70, the tip 82 is resiliently deflected away from the first side wall 76 by the pin 100 until the pin 100 reaches the recessed portion 84 of the tip 82 whereupon the tip 82 will deflect back towards its original unbiased position. As shown in FIG. 3, the recess 84 of the tip 82 of the detent finger 80 engages the pin 100 when the pin 100 is moved towards the outer end wall 74 to urge the pin 100 to remain in the locked position and thereby urges the locking bar 104 to remain in the locked position as shown in FIG. 3 adjacent the outer end wall 54.

When the locking bar 104 is located adjacent the outer end wall 54 as shown in FIG. 3, the ends 106 and 108 of the locking bar 104 are located in respective recesses 128 in the wheels 14 and 16 such that the locking bar 104 will engage the ribs 126. Rotation of the wheels 14 and 16 is prevented by the locking bar 104 engaging the ribs 126 of the wheels 14 and 16 and either the first side wall 56 of the first slot 50 or the base 61 of the detent finger 60 depending upon which direction of rotation of the wheels 14 and 16 is being resisted. The forces which are applied to the locking bar 104 in resisting rotation of the wheels 14 and 16 are substantially at a right angle to the force which is applied to the locking bar 104 to move the locking bar 104 between the locked and unlocked positions within the first slot 50. The forces applied to the locking bar 104 in resisting rotation of the wheels 14 and 16 therefore are not applied to or resisted by the arms 92 and 94 of the brake actuating lever 18 and do not attempt to move the locking bar 104 from the locked position shown in FIG. 3 to the unlocked position shown in FIG. 2. The detent fingers 60 and 80 therefore do not need to develop high retention forces to retain the locking bar 104 in either the locked or unlocked position as these retention forces do not need to resist rotational movement of the wheels 14 and 16. The shifting of the locking bar 104 between the locked and unlocked positions may therefore be easily accomplished with the application of small forces to the actuating lever 18. As the retention forces are low, the parts of the caster 10 will not wear out for a long period of time. In addition, the actuating lever 18 may remain in the locked or unlocked position for any length of time as the detent fingers 60 and 80 are substantially in their relaxed or unbiased positions while retaining the locking bar 104 in either the locked or unlocked position such that no memory characteristics will be developed in the detent fingers 60 and 80 which may otherwise cause them to lose their retention capability.

The brake actuating lever 18 may be moved from the locked position as shown in FIG. 3 to the unlocked position as shown in FIG. 2 by applying an upward force on the actuating member 110 sufficient to overcome the retention force of the detent finger 80 whereupon the pin 100 and locking bar 104 are simultaneously moved to the opposite ends of their respective slots 50 and 70 by the pivotal movement of the actuating lever 18. As the locking bar 104 moves toward the inner end wall 52 it resiliently deflects the tip 62 away from the first side wall 56 until the locking bar 104 reaches the recessed portion 64 of the tip 62 whereupon the tip 62 deflects back towards its original unbiased position to releasably retain the locking bar in the unlocked position. This embodiment of the caster and brake arrangement is considered to be bi-stable in that in both the locked and unlocked positions the locking bar is acted on by a detent to urge it to remain in that position until sufficient force is applied to overcome the detent and move the arrangement to the alternate position. There are no critical dimensions requiring high tolerances in the parts comprising the brake actuating lever 18, the slots 50 and 70, or the detent fingers 60 and 80.

FIGS. 6-10 show a second embodiment of a caster according to the present invention designated with the numeral 140. The caster 140 includes a central body 142, a first wheel 144 and a second wheel 146 rotatably mounted with respect to the central body 142, and a brake actuating lever 148. The central body 142 includes a cylindrical socket 150 adapted to receive a pintle (not shown) for attachment to an article such as a piece of furniture. A first side panel 152 and a second side panel 154 are attached to the socket 150 and extend outwardly therefrom, the side panels being spaced apart and parallel to one another. A cylindrical axle 156 having a longitudinal axis 158 extends through a bore in the first leg 52, a bore in the second leg 154 and through a hub 160 located between the legs 152 and 154. The axle 156 extends between a first end 162 and a second end 164. Each side panel 152 and 154 also includes a generally horizontal open-end slot 166 having an inner end wall 168.

A first slot 170 is formed in the first side panel 152 of the central body 142. The first slot 170 is generally U-shaped and is formed by an inner end wall 172, an outer end wall 174, a first side wall 176 and a second side wall 178. The end walls 172 and 174 extend generally perpendicular to a radius from the axis 158. The side walls 176 and 178 are generally parallel to a radius extending from the axis 158. A resilient detent finger 180 is attached at its base to the outer end wall 174 and extends generally downwardly towards the inner end wall 172 to a tip 182 including a recessed portion 184 having an edge 186. The tip 182 is spaced apart from the inner end wall 172.

As best shown in FIG. 10, a second slot 190 is formed in the second side panel 154 of the central body 142. The second slot 190 is formed by an inner end wall 192 and an opposing outer end wall 194 and a first side wall 196 and an opposing second side wall 198. The second slot 190 is located in registration with the first slot 170. A resilient detent finger 200 is attached at its base to the inner end wall 192 and extends generally upwardly towards the outer end wall 194 to a tip 202 including a recessed portion 204 having an edge 206. The tip 202 is spaced apart from the outer end wall 194. The detent fingers 180 and 200 thereby extend generally in opposite directions relative to one another.

The brake actuating lever 148 carries a pin 210 which extends outwardly from either side thereof and which is positioned to lie within the slots 166 of the side panels 152 and 154 to provide pivotal movement of the brake actuating lever 148 between a locked position as shown in FIGS. 8-10 and an unlocked position as shown in FIG. 7. A cylindrical locking bar 212 extends through the brake actuating lever 148, through the slots 170 and 190 and outwardly beyond the side panels 152 and 154. The locking bar 212 is located within the slot 170 between the inner end wall 172 and the outer end wall 174 and between the first side wall 176 and the detent finger 180. The locking bar 212 at its other side is located within the slot 190 between the inner end wall 192 and the outer end wall 194 and between the first side wall 196 and the detent finger 200. The locking bar 212 extends between a first end 214 and a second end 216. An actuating member 218 is located at the end of the brake actuating lever 148 and is located outside of the central body 142 to provide selective pivotal movement of the brake actuating lever 148 and the associated locking bar 212 between the unlocked position as shown in FIG. 7 and the locked position as shown in FIGS. 8-10.

As best shown in FIG. 9, each wheel 144 and 146 includes a circular outer rim 230 for rolling engagement with a floor or other support surface and a side wall 232 extending within the outer rim 230. A cylindrical hub 234 extends inwardly from the side wall 232 concentrically within the outer rim 230. A cylindrical bore extends through the side wall 232 and the hub 234. A plurality of spaced apart ribs 236 extend radially inwardly from an inner face surface of the outer rim 230. Each pair of adjacent ribs 236 forms an open recess 238 therebetween. The hub 234 extends inwardly beyond the inner edge of the outer rim 230 to space the outer rim 230 apart from the central body 142. The axle 156 extends through the hubs 234 and side walls 232 of the wheels 144 and 146 such that the wheels 144 and 146 may rotate about the axle 156. The wheels 144 and 146 are retained on the axle 156 by circular ribs formed on the ends 162 and 164 of the axle 156 which mate with inwardly extending grooves formed on the interior surface of the hubs 234 while permitting rotation of the wheels 144 and 146 about the axle 156 and the axis 158 similar to the wheel retention arrangement disclosed for the embodiment of FIGS. 1-5.

When the brake actuating lever 148 is in the unlocked position as shown in FIG. 7, the locking bar 212 is located adjacent the inner end wall 172 of the first slot 170 and the inner end wall 192 of the second slot 190. In this position, the recessed portion 184 of the tip 182 of the detent finger 180 engages the locking bar 212 to thereby urge the locking bar 212 to remain in the unlocked position. When the locking bar 212 is located in the unlocked position adjacent the inner end walls 172 and 192 as shown in FIG. 7, the locking bar 212 is located outside of the recesses 238 such that the wheels 144 and 146 may freely rotate about the axle 164.

The brake actuating lever 148 and the associated locking bar 212 is moved to the locked position as shown in FIGS. 8-10 by pressing downwardly on the actuating member 218. As the actuating member 218 is pressed downwardly, the retention force of the detent finger 180 created by the engagement of the recessed portion 184 against the locking bar 212 will be overcome thereby permitting the locking bar 212 to move from the position adjacent the inner end walls 172 and 192, as shown in FIG. 7, to a locked position adjacent the outer end walls 174 and 194, as shown in FIGS. 8-10, wherein the ends 214 and 216 of the locking bar 212 are located within a recess 238 of each wheel 144 and 146. When the actuating lever 148 and locking bar 212 are in the locked position rotation of the wheels 144 and 146 is prevented by engagement of the ribs 236 against the locking bar 212. As the locking bar 212 moves from the inner end wall 192 to the outer end wall 194 of the second slot 190, the locking bar 212 will bias the tip 202 away from the first side wall 96 such that when the locking bar 212 reaches the outer end wall 194, the recessed portion 204 of the tip 202 of the detent finger 200 will be positioned to engage the locking bar 212 and will urge the locking bar 212 to remain in the locked position. This arrangement, as the embodiment shown in FIGS. 1-5, is also bi-stable for the same reason.

The brake actuating lever 148 may be returned to the unlocked position from the locked position by pressing upwardly on the actuating member 218 and thereby overcoming the retention force provided by the detent finger 200 and moving the locking bar 212 downwardly to the inner end walls 172 and 192. As the locking bar 212 moves from the outer end wall 174 to the inner end wall 172 of the slot 170, the locking bar will bias the tip 182 of the detent finger 180 away from the first side wall 176 such that when the locking bar 212 reaches the inner end wall 172, the tip 182 will return to its unbiased position and the recessed portion 184 will be positioned to engage the locking bar 212 and will urge the locking bar 212 to remain in the unlocked position.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A twin wheel caster and brake assembly including a central body;
   an axle associated with said central body and extending from opposite sides of said central body;
   a pair of wheels, one adapted to be mounted on each end of said axle, each wheel defining a plurality of radially inwardly extending ribs on an inner face thereof with adjacent ribs defining a recess therebetween;
   at least one slot formed in said central body having a first end and a second end;
   a brake actuating lever movable between a brake locked position and a brake unlocked position;
   pivot means associated with said brake actuating lever and said central body adapted to facilitate pivoting of said brake actuating lever as it moves between said locked and unlocked positions;
   a locking bar associated with said brake actuating lever and extending from both sides thereof, said locking bar movable within said slot; and
   first detent means formed by said slot, said first detent means adapted to act on said locking bar when said locking bar is in said unlocked position urging said locking bar to stay in said unlocked position whereby when said brake actuating lever is in said unlocked position said locking bar is located out of contact with said ribs and when said brake actuating lever is moved to said locked position said locking bar moves along said slot until said ends are located within said recesses in said wheels thereby engaging said ribs and preventing rotation of said wheels.

2. A twin wheel caster and brake assembly as in claim 1 wherein said at least one slot includes first and second slots formed in said central body, said first detent means associated with said first slot to urge said locking bar to stay in said unlocked position and further including second detent means associated with said second slot adapted to act on said locking bar when it is in said locked position to urge it to stay in said locked position.

3. A twin wheel caster and brake assembly as in claim 2 further in which each of said first and second detent means comprises a finger having a base at one end of said slot and a resilient tip extending along said slot and spaced apart from the other end of said slot.

4. A twin wheel caster and brake assembly as in claim 2 wherein said central body includes a first side panel and a second side panel wherein said first slot is located in said first side panel and said second slot is located in said second side panel.

5. A twin wheel caster and brake assembly as in claim 1 wherein said at least one slot includes first and second slots formed in said central body, each said slot having a first end and a second end, wherein said locking bar is moveable within said first slot and said pivot means is simultaneously moveable within said second slot as said brake actuating lever moves between said locked and unlocked positions.

6. A twin wheel caster and brake assembly as in claim 5 in which said pivot means comprises a pin extending through said brake actuating lever and through said second slot such that as said brake actuating lever moves between said locked and said unlocked positions said pin moves laterally along said second slot and said brake actuating lever simultaneously pivots around said pin.

7. A twin wheel caster and brake assembly as in claim 1 including an actuating member connected to an end of said brake actuating lever and disposed outwardly of said central body to facilitate movement of said brake actuating lever between said locked and unlocked positions.

* * * * *